United States Patent [19]

Moorman

[11] 4,239,670
[45] Dec. 16, 1980

[54] FLAME RETARDANT LATEXES

[75] Inventor: David S. Moorman, Houston, Tex.

[73] Assignee: Witco Chemical Company, New York, N.Y.

[21] Appl. No.: 940,472

[22] Filed: Sep. 8, 1978

[51] Int. Cl.$^3$ .................. C08L 31/04; C08L 33/08; C08L 9/08; C08L 9/10
[52] U.S. Cl. .................. 260/29.6 MP; 106/18.15; 260/29.7 P; 260/739
[58] Field of Search ............ 260/29.6 MP, 29.7 P, 260/739; 106/18.15

[56] References Cited

U.S. PATENT DOCUMENTS

| | | | |
|---|---|---|---|
| 2,036,854 | 4/1936 | Dickie et al. | 91/68 |
| 2,357,725 | 9/1944 | Bennett | 260/32 |
| 2,452,054 | 10/1948 | Jones et al. | 260/17.3 |
| 2,912,392 | 11/1959 | Stilbert et al. | 260/17.4 |
| 2,912,393 | 11/1959 | Stilbert et al. | 260/17.4 |
| 3,058,927 | 10/1962 | McMaster et al. | 260/2.5 |
| 3,061,492 | 10/1962 | Singleton et al. | 154/43 |
| 3,403,123 | 9/1968 | Cooperman et al. | 260/29.6 |
| 3,840,488 | 10/1974 | Steinwand | 260/29.7 P |
| 3,870,590 | 3/1975 | Hurwitz | 161/92 |
| 4,049,609 | 9/1977 | Aguirre | 63/12 |

Primary Examiner—Earl A. Nielsen
Attorney, Agent, or Firm—Arnold, White & Durkee

[57] ABSTRACT

A latex otherwise unstable to diammonium phosphate may be improved by the addition of an effective flame-retardant amount of an additive which comprises from one to five parts by weight of ammonium bromide to one part by weight of diammonium phosphate.

10 Claims, No Drawings

FLAME RETARDANT LATEXES

FIELD OF THE INVENTION

This invention relates to novel flame-retardant latexes which are useful as binders for many fibers including woven and non-woven cotton, polyester fibers, blends of cotton and polyester, rayon, nylon, hemp and cellulosic fibers. This invention also relates to methods of producing such latexes.

BACKGROUND OF THE INVENTION

Latexes have been used for binding polyester fibers for quite some time. Because of the inherent flammability of polyesters, flame retardant compositions have been added to binders in order to make the bound polyester fibers less fire or flame hazardous than they would otherwise be.

It should be understood that when using the words "flame retardant" or words of similar import herein, it is intended to refer to a composition which "enables a material to resist burning when exposed to a relatively low-energy ignition source, such as a cigarette, match, candle, cigarette lighter, or stove burner." "Flame Retardants—government regulations and public emphasis on safety provide the importance for an expanding industry," CHEMICAL & ENGINEERING NEWS, Apr. 24, 1978, PP. 22-36, 23.

Many chemicals have been used to flame retard fibers. Probably one of the most well known of these chemicals is Tris, tris-(2,3-dibromopropyl) phosphate. This chemical was once used as a flame retardant for children's sleepwear but is no longer used for such a purpose after testing revealed that the compound might be carcinogenic in humans.

Since the advent of the Tris crisis, manufacturers have sought to fill in the gap left by the departed Tris. Some members of the industry have sought to produce inherently flame-retardant fibers thereby obviating the need for flame retardant coatings on the fibers. However, fibers other than those which are inherently flame-retardant are still being produced. Thus, a need still exists for flame-retardant chemicals to be used in coating these fibers.

Chemicals other than Tris have been used as flame retardants for fibers and, in particular, polyester fibers. For example, Stauffer has commercialized Fyrol FR-2, Tris (1,3-dichloroisopropyl) phosphate, as a polyester fiber flame retardant. Mobil Chemical has sold Antiblaze 19, a mixture of two cyclic phosphonate esters, as flame-retardant for polyester fibers. Of course, many other flame retardants are commercially available for use with various fibers.

There have been many disclosures in U.S. patents concerning chemicals useful as flame retardants for many different types of materials. U.S Patent No. 2,036,854 discloses a composition useful in flame proofing textile materials which is a mixture of ammonium borate or phosphate with an ammonium halide such as ammonium bromide. That patent further discloses that the added ammonium halide appears to greatly increase the flame extinguishing properties of ammonium borate or phosphate.

U.S. Patent No. 2,452,054 concerns flame-retardant compositions for cellulosic materials. In that patent there are disclosed chemicals which convert nonresinous carbonific material utilized in the cellulosic material into a foam-like, puffed-up layer which is resistant to combustion. The chemicals disclosed include diammonium phosphate and ammonium bromide.

U.S. Pat. No. 3,058,927 relates to self-extinguishing aromatic polymer compositions. In the patent it is disclosed that the combination of ammonium bromide with certain agents act as synergists to enhance the flameproofing action of ammonium bromide and render the polymers self-extinguishing. It is further disclosed that it is known to employ an ammonium salt such as ammonium phosphate in combination with ammonium bromide to prevent the flamming of inflammable articles such as fabrics, paper, wood or the like.

U.S. Pat. No. 3,061,492 relates to polyester laminates which are flame-retardant. It is disclosed that ammonium bromide may be used as a flame-retardant for unsaturated polyester resin compositions.

U.S. Pat. No. 3,870,590 discloses the utility of adding one or more flame retardants to polyester fibers. It is also disclosed that a synergistic effect is obtained when one or more flame retardants are employed. Further, it is stated that the more important flame retardant synergists contain a halogen such as bromine or chlorine, antimony, phosphorous or nitrogen.

U.S. Pat. No. 4,049,609 relates to unsaturated polyester resin systems which include flame retardants. It is disclosed that bromine and phosphorous compounds may be used as flame retardants.

U.S. Pat. No. 3,840,488 discloses flame-retardant additives for an aqueous latex of a butadiene-styrene polymer useful for textile treatment and carpet backing application. In that patent it is disclosed that the addition of ammonium bromide and urea as a flame-retardant additive to a latex undesirably reduces the viscosity of the latex. It is further disclosed that the undesirable decrease in the viscosity which is observed by the addition of the ammonium bromide and urea into the latex may be prevented by adding another fire-retardant material to the latex such as a halo alkyl phosphoric acid or salt.

The synergistic effect of combining different flame-retardant compositions appears to be dependent on the flame-retardant composition used and on the particular application. For example, a paper entitled "Requirements For The Flame-Retardant Finishing Of Polyester/Cellulosic Blends" by Katherin V. Stevens and Steven B. Sello discloses that a nitrogen/phosphorous synergistic effect has been observed on certain cotton and polyester/cotton blends which have been treated with nitrogen and phosphorous containing compounds. That paper also discloses that a bromine/phosphorous synergism is observed in combinations of brominated aliphatic or aromatic compounds and organophosphorous compounds. However, it was disclosed that only an additive effect was noted with the combination of an inorganic bromine compound such as ammonium bromide with organophosphorus compounds.

The synergistic effect observed by the combination of phosphorous-containing compounds with halogenated compounds is suggested by Table 1-10 in the 1970 edition of THE CHEMISTRY AND USES OF FIRE RETARDANTS BY JOHN W. LYONS. That table notes that while 5% of a phosphorous containing compound or 12-15% of a bromine-containing compound are required to render polyester polymers self-extinguishing, the combination of 2% of a phosphorous-containing compound and 6% of a bromine-containing compound has the same effect.

Some flame-retardant compounds when added to latexes cause the latexes to become unstable. By unstable it is meant that the latex agglomerates and/or has a significant change in viscosity. In some instances, instability may be caused by adding particular types of flame retardant compounds to latexes which are extremely pH sensitive. Generally, such changes, agglomeration and/or rheological property changes, are undesirable because the latexes cannot be used for their intended purpose. For example, there are many latexes which are unstable to the addition of diammonium phosphate.

It would be desirable to take advantage of the synergistic effect of combining flame-retardant compounds and adding those compounds to a latex to produce a latex having enhanced flame retarding properties without substantially affecting the rheological properties of the latex. It would also be desirable to prepare a flame-retardant compound whose pH can be adjusted to allow use of the compound in extremely pH sensitive latexes. In addition, it would also be desirable to produce a non-toxic additive to latex which might be used as a replacement for Tris.

SUMMARY OF THE DISCLOSURE

It has been discovered that latexes which are otherwise unstable to diammonium phosphate may be improved by adding an effective amount of flame-retardant additive which comprises from one to five parts by weight of ammonium bromide to one part by weight of diammonium phosphate. This improvement may be made without producing the undesirable properties which result from the addition of diammonium phosphate alone. Additionally, the produced latexes are non-toxic.

These latexes may be made by adding to the latex an effective flame retardant amount of an additive which comprises from one to five parts by weight of ammonium bromide to one part by weight of diammonium phosphate. An effective flame-retardant amount of the additive may be from about 5 to about 30 weight percent of dry additive based on the dry weight of the untreated latex.

The latexes which are otherwise unstable to diammonium phosphate and which may be utilized in accordance with the teachings of the instant invention include the following latexes: acrylic, polyvinyl acetate, styrene-butadiene copolymer, ethylene vinyl acetate copolymer, neoprene, polyisoprene, nitrile rubber polybutadiene, ethylene propylene copolymer and polyvinyl chloride.

The latexes of the instant invention and the latexes made in accordance with the method of the instant invention are useful for many purposes including application to carpet backing, air filters and housing insulation. Fibrous substrates to which the novel latexes of the instant invention may be applied include woven and non-woven polyester, cotton, blends of cotton and polyester, rayon, nylon, hemp and cellulosic fibers.

DESCRIPTION OF THE PREFERRED EMBODIMENTS

It has been discovered that dried or cured polymeric latexes show improved flame retarding properties when the latexes are treated in accordance with the method of the instant invention. The method comprises the addition to a latex of an effective flame-retardant amount of an additive which comprises from one to five parts by weight of ammonium bromide to one part by weight of diammonium phosphate.

The latexes made in accordance with the method of the instant invention may be used to coat and render flame-retardant flammable materials such as woven and non-woven polyester, cotton, blends of cotton and polyester, rayon, nylon, hemp and cellulosic fibers. Since it is desirable to coat the flammable materials with the improved latex it is desirable that the additive not have any significant effect on the rheological properties of the latex. That is, the improved latex should not agglomerate or have any significant change in viscosity. For example, some latexes which are extremely pH sensitive become unstable when a flame retardant compound having a pH different from that of the latex is added to the latex.

The polymer latexes which are useful in the practice of the instant invention are those latexes which are unstable to diammonium phosphate. By that it is meant that the addition of diammonium phosphate to the latex may cause the latex to agglomerate or may change the viscosity of the latex significantly. These properties are undesirable since such properties would make it most difficult to use the latexes for their intended purposes.

Many latexes may be used in accordance with the teachings of the instant invention including latexes selected from the latex group consisting of: polyvinyl acetate (PVA), styrenebutadiene rubber (SBR), acrylic, ethylene vinyl acetate copolymer, neoprene, polyisoprene, nitrile rubber, polybutadiene, ethylene propylene copolymer and polyvinyl chloride.

Polymeric latexes which are useful in the practice of the instant invention include many of those which are commercially available. These commercially available latexes include those made by Rohm & Haas Company, Union 76, Union Carbide Co., Celanese Chemical Co. and National Starch.

In accordance with the preferred embodiment of the instant invention, an aqueous solution of diammonium phosphate and ammonium bromide is prepared. Although, the ratio of ammonium bromide to diammonium phosphate in the aqueous solution may vary, it is preferred that two parts by weight of ammonium bromide be mixed with one part by weight of diammonium phosphate. It is also preferred that the aqueous solution have thirty-three weight percent total solids. After the solution is formulated, it is preferred to adjust the pH of the solution of from 7.5–8.5 by the addition of a suitable pH adjustor such as concentrated ammonium hydroxide or phosphoric acid.

Although the preferred pH range of the additive of the instant invention is from 7.5–8.5 it should be understood that the pH of the additive solution may be adjusted from 3.0–11.0 depending on the latex with which the additive is to be used. In those instances where the latex is extremely pH sensitive, it is preferred to adjust the pH of the additive solution to a value which closely matches the pH of the latex prior to the admixture of the additive to the latex. However, it should be apparent that in some instances, e.g. where the latex is not extremely pH sensitive, the pH of the additive need not be adjusted prior to admixture with the latex.

Once prepared, the aqueous flame retardant solution may be added to the latex. Generally, it should be sufficient to add approximately 5 to 30 weight percent of dry additive based on the dry weight of the untreated latex. By this it is meant that the volume of additive added to the volume of latex is equivalent to 5 to 30 parts by weight of dry additive per 100 parts by weight dry latex. Preferably with a PVA latex or an acrylic latex from about 15 to 26 weight percent of the additive is added to the latex. Again, it should be understood that the weight percentage described above is based upon the weight of solid in the additive per total solids content by weight of the untreated latex.

In the preferred embodiment, the preferred aqueous solution of diammonium phosphate and ammonium bromide described above (commericalized as FYARESTOR-330) is added to an acrylic latex (Rohm and Haas Rhoplex TR-407) in an amount of about 15 to 26 weight percent of dry additive based on the dry weight of the untreated latex.

In the preferred embodiment, the preferred flame retardant latex is used to flame retard polyester fibers. The total latex added to the polyester fibers may be from about 20–30 weight percent based on dry weight of flame retarded latex per dry weight of untreated fiber. Preferably, the latex is added in the amount of about 22–28 weight percent.

When preparing a latex in accordance with the teachings of the instant invention it should be understood that the addition of diammnium phosphate and ammonium bromide may be made directly to the latex without the need of preparing an aqueous solution of the two chemicals. If the chemicals are added directly to the latex then care should be taken to avoid adding the diammonium phosphate before the diammonium bromide. Once the flame retardant additive is admixed with the latex, the resultant latex may be pH adjusted by adding a suitable pH adjustor such as concentrated ammonium hydroxide or phosphoric acid.

The latexes of this invention may be used for many purposes including application to carpet backing, and air filters or housing insulation. One very practical use has been found to be the application of the latex to unwoven polyester fibers for use as air conditioner fibers. The application of the latex to the fibers serves two functions. The unwoven fibers may be simultaneously bound and rendered flame retardant by the application.

The polyester fibers for which the latex of the instant invention may be as a binder and flame retardant include but are not limited to those fibers which are now commercially available. For example, those fibers include cotton, polyester, blends of cotton and polyester, rayon, nylon, hemp and cellulose.

The latexes of the instant invention may be applied to substrates by any method including methods which are well known in the art. For example, when a latex is to be applied to unwoven polyester fibers it may be applied by methods well known in the art such as kiss roll, knife coating, airless spray or padding. Irrespective of which method of application is used, the latex which has been applied to the fibers should be dried or cured. This drying step may be conducted by heating the fibers at a relatively low temperature (e.q. 300° F.) for a short period of time sufficient to effect a proper cure.

The additive flame retardant of the instant invention is an aqueous solution of ammonium bromide and diammonium phosphate. In the preferred embodiment, the aqueous solution has thirty-three weight percent total solids and the weight ratio of ammonium bromide to diammonium phosphate of 2 parts to 1. Also, it is preferred that the resultant aqueous solution have its pH adjusted to between 7.5–8.5 by the addition of a suitable pH adjustor such as concentrated ammonium hydroxide or phosphoric acid. This preferred additive for admixture with latexes in accordance with the teachings of the instant invention is presently commercialized by the assignee of the inventor of the instant invention as FYARESTOR-330.

In order to more clearly disclose the nature of the present invention, specific examples are set forth below.

EXAMPLE 1

Application of latexes of the instant invention to substrates

1a. In this example, 15 gals. of FYARESTOR-330 is admixed with 50 gals. of Rohm and Haas Rhoplex TR-407 Acrylic and this resultant mixture is diluted with 40 gals. of water. This solution is then applied to a nonwoven polyester sheet in the following well known manner (hereinafter referred to as "polyester application method"): Loose polyester fibers are passed through a garnet sizer. The non-woven polyester sheet produced in the garnet sizer is sprayed with the flame retardant latex solution whose formulation was described above. Then, the wet non-woven polyester sheet is slowly passed through an oven at 300° F. The dried bonded fiber is rolled and packaged. This example describes the preferred embodiment of the latex of the instant invention as applied to polyester fibers.

1b. In this example, 908 ml of FYARESTOR-300 is admixed with one gal. of Union 76 Resin 3077 latex. The resultant mixture is diluted with 4 gallons of water. This diluted latex solution may be mixed with a cellulose paper fiber for application to a substrate. Typically, the mixture is applied to walls or ceilings as insulation. The latex and cellulose may be applied to any suitable substrate by use of a K-13 sprayer sold by National Cellulose. The substrate coated with 1-2 inches of insulation coating may be left to dry at room temperature for about three to seven days. This method of using flame-retarding cellulose fiber will hereinafter be referred to as "cellulose fiber method." This example illustrates the use of the latex of the preferred embodiment on a cellulose fiber.

EXAMPLE 2

The purpose of this example is to compare the efficacy of FYARESTOR-330 with ammonium bromide when used at equal levels in the acrylic, polyvinyl acetate, and styrene butadiene rubber latex binders indicated in TABLE I. The various latexes and flame retardant compositions were admixed in the concentrations indicated in TABLE I. Further, each flame retardant latex was applied with a fly sprayer on both sides of a non-woven polyester fiber filter.

The wet polyester filters were dried in an oven at 300° F. The flame retardant latex added in each case amounted to approximately 25 weight percent (dry basis).

In each instance, the dried samples had their horizontal edges exposed to a flame for edge ignition. Each edge of each sample was ignited and the average of those observations is recorded in TABLE I. The following flame retardant rating was utilized:
1. extinguishes in less than 5 seconds
2. extinguishes in less than 30 seconds
3. extinguishes sometimes (borderline)
4. burns slowly
5. burns rapidly The results show that, for example, with the Rohm & Haas PVA latex, FYARESTOR-330 is a more effective flame retardant than ammonium bromide. Further, less of the flame retardant additive is required to achieve equivalent flame ratings with the acrylic polymer due to that polymer's lower flammable properties.

above—these results are listed in the column entitled "Oxygen Index F.R. Substrate."

(3) the treated substrates were also tested using Department of Transportation test #302 (See Col. entitled "D.O.T. 302 F.R. Sub.") and Underwriter's Laboratory test No. 94 (See Col. entitled "U.L. 94 F.R. Sub.").

TABLE I

COMPARISON OF FYARESTOR 330 TO NH4Br IN VARIOUS LATEX BINDERS ON POLYESTER FIBER

| | A | B | C | D | E | F | G | H | I | J | K | L | M | N | O | P | Q |
|---|---|---|---|---|---|---|---|---|---|---|---|---|---|---|---|---|---|
| E-779 | 50 | 50 | 50 | 50 | 50 | — | — | — | — | — | — | — | — | — | — | — | — |
| TR-407 | — | — | — | — | — | 50 | 50 | 50 | — | — | — | — | — | — | — | — | — |
| Ucar 822 | — | — | — | — | — | — | — | — | 50 | 50 | 50 | 50 | 50 | — | — | — | — |
| Amsco 4125 | — | — | — | — | — | — | — | — | — | — | — | — | — | 50 | 50 | 50 | 50 |
| NH4Br (33% sol.) | 12 | — | 15 | — | 18 | 12 | — | — | 12 | 15 | 18 | — | — | 12 | — | 15 | — |
| Fyarestor 330 | — | 12 | — | 15 | — | — | 12 | 15 | — | — | — | 12 | 15 | — | 12 | — | 15 |
| H2O | 40 | 40 | 40 | 40 | 40 | 40 | 40 | 40 | 40 | 40 | 40 | 40 | 40 | 40 | 40 | 40 | 44 |
| Flame Rating | 4 | 3 | 4-3 | 2 | 4-3 | 1 | 1-2 | 1 | 2-3 | 2 | 1 | 3 | 3-2 | 2 | 2 | 1 | 1 |

Notes:
E-779 Rohm & Haas PVA Latex
TR-407 Rohm & Haas Acrylic Latex
Ucar 822 Union Carbide SBR Latex
4125 Amsco SBR Latex
(Except for flame rating, all values are in volume (ml).)

EXAMPLE 3

The efficacy of FYARESTOR 330 on different substrates is illustrated in Table II. Each latex mixture was prepared by admixing the volumetric ratios of each respective component as indicated in the column headed by "FYARESTOR-330/LATEX." Each prepared latex mixture applied to substrates C-F was then volumetrically diluted fourfold by addition of water. For example, 4 gallons of one mixture was first diluted with 4 gallons of water and then rediluted with 8 gallons of water.

The total amount of solids (weight % basis) added to the substrate is indicated in the column head by % total solids add-on. Substrates A and B were treated as described in Examples 1a and 1b respectively. The remaining substrates were treated by dip bath application method where the substrates were dipped in to the indicated latex solution and the excess solution was removed by squeezing.

Each substrate was tested as follows:
(1) the flame retardancy of untreated substrates was measure by the ASTM-D-2863-76 Oxygen Index Test—these results are listed in the column entitled "Oxygen Index of Substrate."
(2) the flame retardancy of treated substrates was measured by the same ASTM test as used in (1)

The results indicate that all substrates showed significant improvement in flame retardancy after treatment with latexes produced in accordance with the teachings of the instant invention.

TABLE II

EVALUATION OF FYARESTOR-300 IN FIBER SUBSTRATES

| | Substrate | % Total Solids Add-On | FYARESTOR-330/LATEX | Application Method | Oxygen Index of Substrate | Oxygen Index F.R. Substrate | D.O.T. 302 F.R. Sub. | U.L. 94 F.R. Sub. | Comments |
|---|---|---|---|---|---|---|---|---|---|
| A. | Non-woven Polyester | 22 | 15/50 Rohm & Haas TR-407 | Spray | — | — | Pass | — | High loft. Ease in handling. |
| B. | Cellulose Fiber | — | 15/50 Union 76 3077 | Spray | 31 | 43 | Pass | PV-O | Good adhesion & physicals. |
| C. | Hemp Burlap Woven | 22 | 18/50 Rohm & Haas HA-24 | Dip Bath | 22.5 | 26 | Pass | — | Slight rigidity. No color change. |
| D. | 50 Polyester/ 50 Cotton Woven | 23 | 18/50 Rohm & Haas HA-24 | Dip Bath | 19 | 24 | Pass | — | Slight rigidity. No color change. |
| E. | Acrylic Knit | 24.2 | 18/50 Rohm & Haas HA-24 | Dip Bath | 21.5 | 26 | Pass | — | No color change. |
| F. | Rayon Woven | 28 | 18/50 Rohm & Haas HA-24 | Dip Bath | 21 | 26 | Pass | — | No color change. Slight rigidity increase |

While the preferred embodiment of the above described invention is to be understood to be the best mode presently contemplated, it is by no means the only embodiment possible. The scope of the invention is defined by the following claims and by any equivalent modifications and variations that fall within the true spirit of the invention.

What is claimed is:

1. In a latex otherwise unstable to diammonium phosphate, the improvement wherein said latex has added thereto an effective flame-retardant amount of an additive comprising from one to five parts by weight of ammonium bromide to one part by weight of diammonium phosphate.

2. The latex of claim 1 wherein said additive is present in said latex in an amount of about 5 to about 30 weight percent.

3. The latex of claim 2 wherein said latex otherwise unstable to diammonium phosphate is selected from the latex group consisting of: acrylic, polyvinyl acetate, styrenebutadiene copolymer, ethylene vinyl acetate copolymer, neoprene, polyisoprene, nitrile rubber, polybutadiene, ethylene propylene copolymer and polyvinyl chloride.

4. The latex of claim 3 wherein said latex is a polyvinyl acetate latex having from about 15 to B 26 weight percent of said additive and wherein said additive comprises an aqueous solution including two parts by weight of ammonium bromide to one part of weight of diammonium phosphate and having 33 weight percent solids.

5. The latex of claim 3 wherein said latex is an acrylic latex having from about 15 to 26 weight percent of said additive and wherein said additive comprises an aqueous solution including two parts by weight of ammonium bromide to one part of weight of diammonium phosphate and having 33 weight percent solids.

6. A method for improving the flame retarding properties of a latex otherwise unstable to diammonium phosphate without substantially affecting said latex's rheological properties which comprises adding to said latex an effective flame-retardant amount of an additive comprising from one to five parts by weight of ammonium bromide to one part by weight of diammonium phosphate.

7. The method of claim 6 wherein said additive is present in said latex in an amount of about 5 to 30 weight percent.

8. The method of claim 7 wherein said latex otherwise unstable to diammonium phosphate is selected from the latex group consisting of: acrylic, polyvinyl acetate, styrenebutadiene copolymer, ethylene vinyl acetate copolymer, neoprene, polyisoprene, nitrile rubber, polybutadiene, ethylene propylene copolymer, and polyvinyl chloride.

9. The method of claim 8 wherein said latex otherwise unstable to diammonium phosphate is a polyvinyl acetate latex to which is added from about 15 to 26 weight percent of said additive and wherein said additive comprises an aqueous solution including two parts by weight of ammonium bromide to one part by weight of diammonium phosphate and having 33 weight percent solids.

10. The method of claim 8 wherein said latex otherwise unstable to diammonium phosphate is an acrylic latex to which is added from about 15 to 26 weight percent of said additive and wherein said additive comprises an aqueous solution including two parts by weight of ammonium bromide to one part by weight of diammonium phosphate and having 33 weight percent solids.

* * * * *